(12) United States Patent
Manabe et al.

(10) Patent No.: US 8,154,703 B2
(45) Date of Patent: Apr. 10, 2012

(54) LIQUID CRYSTAL DISPLAY PANEL (75) Inventors: Masumi Manabe, Fukaya (JP); Jin Hirosawa, Saitama (JP); Masanori Imakawa, Fukaya (JP)

(73) Assignee: Toshiba Matsushita Display Technology Co., Ltd., Tokyo (JP)

( * ) Notice: Subject to any disclaimer, the term of this patent is extended or adjusted under 35 U.S.C. 154(b) by 76 days.

(21) Appl. No.: 12/249,196

(22) Filed: Oct. 10, 2008

(65) Prior Publication Data
US 2009/0103021 A1 Apr. 23, 2009

(30) Foreign Application Priority Data

Oct. 23, 2007 (JP) .................................. 2007-275363
Aug. 27, 2008 (JP) .................................. 2008-218473

(51) Int. Cl.
*G02F 1/1339* (2006.01)
(52) U.S. Cl. ........................................................ 349/156
(58) Field of Classification Search ........... 349/155–156
See application file for complete search history.

(56) References Cited

U.S. PATENT DOCUMENTS

| | | | |
|---|---|---|---|
| 6,188,456 B1* | 2/2001 | Koma | 349/113 |
| 7,295,277 B2* | 11/2007 | Mori et al. | 349/155 |
| 2002/0016125 A1* | 2/2002 | Arnaud | 445/24 |
| 2003/0214621 A1* | 11/2003 | Kim et al. | 349/155 |
| 2005/0270472 A1 | 12/2005 | Yamada et al. | |
| 2006/0158600 A1* | 7/2006 | Mun et al. | 349/156 |
| 2006/0187391 A1* | 8/2006 | Hwang | 349/114 |
| 2007/0121052 A1 | 5/2007 | Inoue et al. | |
| 2007/0177094 A1* | 8/2007 | Van Dam et al. | 349/156 |
| 2007/0200990 A1 | 8/2007 | Hirosawa et al. | |
| 2008/0192160 A1 | 8/2008 | Yoshida et al. | |
| 2008/0218679 A1* | 9/2008 | Hong et al. | 349/155 |

FOREIGN PATENT DOCUMENTS

| | | |
|---|---|---|
| JP | 2006-18238 | 1/2006 |
| KR | 10-2006-0016502 | 2/2006 |

OTHER PUBLICATIONS

U.S. Appl. No. 12/649,949, filed Dec. 30, 2009, Imakawa, et al.
Office Action issued Jul. 28, 2010, in Korean Patent Application No. 10-2008-103548 (with English translation).
U.S. Appl. No. 13/180,735, filed Jul. 12, 2011, Tokuoka, et al.

* cited by examiner

*Primary Examiner* — Eric Wong
(74) *Attorney, Agent, or Firm* — Oblon, Spivak, McClelland, Maier & Neustadt, L.L.P.

(57) ABSTRACT

A liquid crystal display panel includes an array substrate including a scanning line, a signal line crossing the scanning line, a switching element electrically connected to the scanning line and the signal line, and a pixel electrode formed on the scanning line, the signal line, and the switching element and electrically connected to the switching element, an opposite substrate including a common electrode with a through-hole and arranged opposite to the array substrate with a gap, a columnar spacer formed on either one of the array substrate and the opposite substrate and positioned away from the pixel electrode, the columnar spacer overlapping the through-hole and holding the gap between the array substrate and the opposite substrate, and a liquid crystal layer sandwiched between the array substrate and the opposite substrate.

3 Claims, 8 Drawing Sheets

LIQUID CRYSTAL DISPLAY PANEL

CROSS-REFERENCE TO RELATED APPLICATIONS

This application is based upon and claims the benefit of priority from prior Japanese Patent Applications No. 2007-275363, filed Oct. 23, 2007; and No. 2008-218473, filed Aug. 27, 2008, the entire contents of both of which are incorporated herein by reference.

BACKGROUND OF THE INVENTION

1. Field of the Invention

The present invention relates to a liquid crystal display panel, and in particular, to a liquid crystal display panel comprising a columnar spacer.

2. Description of the Related Art

In recent years, in a field of information apparatuses, particularly computers and a field of video apparatuses, particularly televisions, lightweight, compact, and high-definition liquid crystal display devices have been developed. In general, a liquid crystal display device comprises a liquid crystal display panel having an array substrate, an opposite substrate, and a liquid crystal layer sandwiched between the array substrate and the opposite substrate. Each of the array substrate and the opposite substrate has a display area. For example, plastic beads with a uniform particle size are arranged between the array substrate and the opposite substrate as spacers to hold a gap between the two substrates constant. The array substrate and the opposite substrate are joined together by a sealing member shaped like a rectangular frame and disposed outside the display area of each of the substrates.

In a color display active matrix driving liquid crystal display device, a plurality of signal lines and a plurality of scanning lines are disposed on the array substrate in the display area thereof in a matrix. A thin film transistor (hereinafter referred to as TFT) including a semiconductor layer made of, for example, amorphous silicon (a-Si) or polysilicon (p-Si) is disposed in the vicinity of a crossing portion between each of the signal lines and each of the scanning lines. TFTs are connected to respective pixel electrodes formed on the substrate. An alignment film is deposited on the substrate and the pixel electrodes.

In the opposite substrate, a color filter, a common electrode, and an alignment film are sequentially formed on a substrate. The color filter is composed of colored layers colored in red, green, and blue, respectively. The liquid crystal layer is sandwiched between the array substrate and the opposite substrate to form the liquid crystal display device.

Furthermore, a technique for uniformizing the gap between the array substrate and the opposite substrate is disclosed in, for example, Jpn. Pat. Appln. KOKAI Publication No. 2006-18238. Jpn. Pat. Appln. KOKAI Publication No. 2006-18238 discloses a technique of forming a columnar spacer on at least one of the array substrate and the opposite substrate by patterning using a photolithography method or the like.

The columnar spacer overlaps the common electrode. Also on the array substrate, the columnar spacer may overlap the pixel electrode. In general, the pixel electrode and the common electrode are formed of ITO (Indium Tin Oxide), which is an inorganic material. In this case, the pixel electrode and the common electrode are fragile like glass. Thus, when the columnar spacer overlaps the pixel electrode and the common electrode, then upon being subjected to impact, the liquid crystal display panel cannot sufficiently absorb the impact. As a result, the common electrode or the like may be damaged. Furthermore, at low temperatures, the liquid crystal display panel cannot sufficiently follow a variation in volume, resulting in a high likelihood of generating bubbles. This degrades display quality.

BRIEF SUMMARY OF THE INVENTION

The present invention is made in view of the above-described points. An object of the present invention is to provide a liquid crystal display panel with high display quality.

To achieve the object, according to an aspect of the present invention, there is provided a liquid crystal display panel comprising:

an array substrate including a scanning line, a signal line crossing the scanning line, a switching element electrically connected to the scanning line and the signal line, and a pixel electrode formed on the scanning line, the signal line, and the switching element and electrically connected to the switching element;

an opposite substrate including a common electrode with a through-hole and arranged opposite to the array substrate with a gap;

a columnar spacer formed on either one of the array substrate and the opposite substrate and positioned away from the pixel electrode, the columnar spacer overlapping the through-hole and holding the gap between the array substrate and the opposite substrate; and a liquid crystal layer sandwiched between the array substrate and the opposite substrate.

According to another aspect of the present invention, there is provided a liquid crystal display panel comprising:

an array substrate including a scanning line, a signal line crossing the scanning line, a switching element electrically connected to the scanning line and the signal line, and a pixel electrode formed on the scanning line, the signal line, and the switching element and electrically connected to the switching element;

an opposite substrate including a common electrode with a through-hole and arranged opposite to the array substrate with a gap;

a light blocking portion provided on either one of the array substrate and the opposite substrate;

a color filter provided on either one of the array substrate and the opposite substrate and including a plurality of colored layers in respective colors, the color filter including a cutout portion formed so as to overlap the light blocking portion;

a columnar spacer formed on either one of the array substrate and the opposite substrate and positioned away from the pixel electrode, the columnar spacer overlapping the through-hole, the light blocking portion, and the cutout portion and holding the gap between the array substrate and the opposite substrate; and a liquid crystal layer sandwiched between the array substrate and the opposite substrate.

According to another aspect of the present invention, there is provided a liquid crystal display panel comprising:

an array substrate including a scanning line, a signal line crossing the scanning line, a switching element electrically connected to the scanning line and the signal line, and a pixel electrode formed on the scanning line, the signal line, and the switching element and electrically connected to the switching element;

an opposite substrate including a common electrode with a through-hole and arranged opposite to the array substrate with a gap;

a light blocking portion provided on either one of the array substrate and the opposite substrate;

a color filter provided on either one of the array substrate and the opposite substrate and including a plurality of colored layer in respective colors, the color filter including a cutout portion formed so as to overlap the light blocking portion;

a columnar spacer formed on either one of the array substrate and the opposite substrate and positioned away from the pixel electrode, the columnar spacer overlapping the through-hole, the light blocking portion, and the cutout portion and holding the gap between the array substrate and the opposite substrate; and a liquid crystal layer sandwiched between the array substrate and the opposite substrate and including a liquid crystal material with a negative dielectric constant anisotropy, wherein the through-hole in the common electrode controls a direction in which a liquid crystal molecule in the liquid crystal layer is inclined.

Additional advantages of the invention will be set forth in the description which follows, and in part will be obvious from the description, or may be learned by practice of the invention. The advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

A liquid crystal display device according to an embodiment of the present invention will be described below in detail with reference to the drawings.

Figure 1:
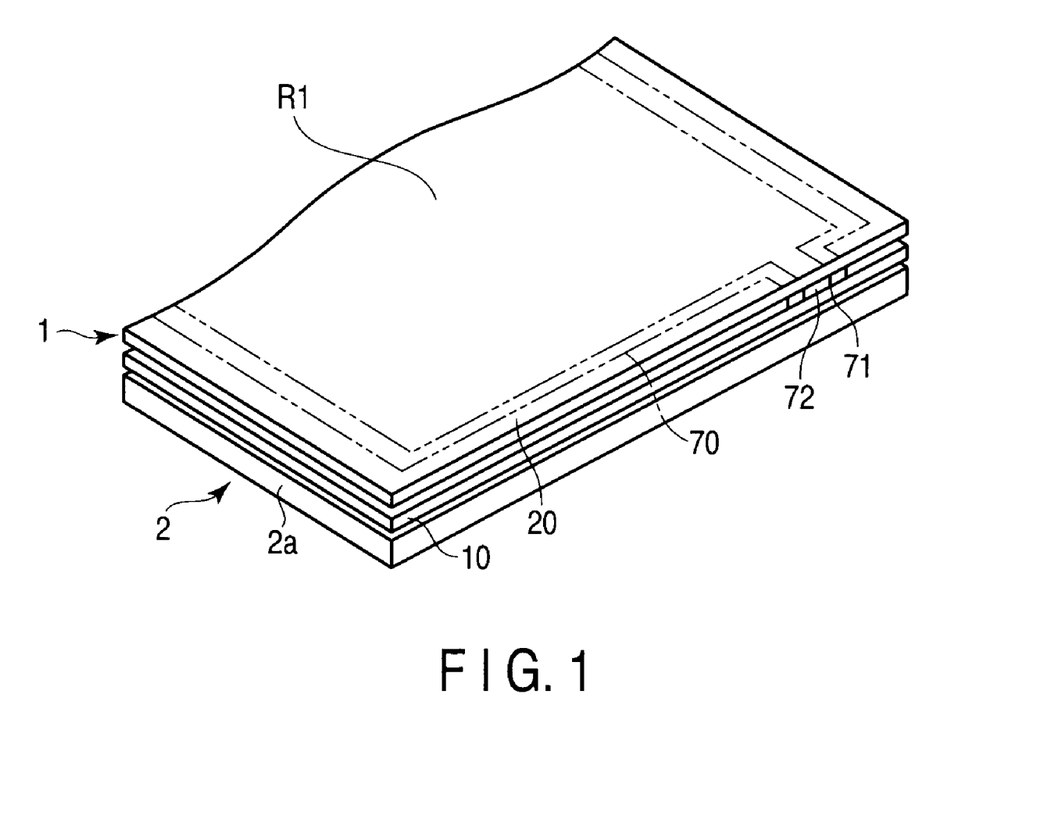
FIG. 1 is a perspective view showing a liquid crystal display device according to an embodiment of the present invention.
Figure 2:
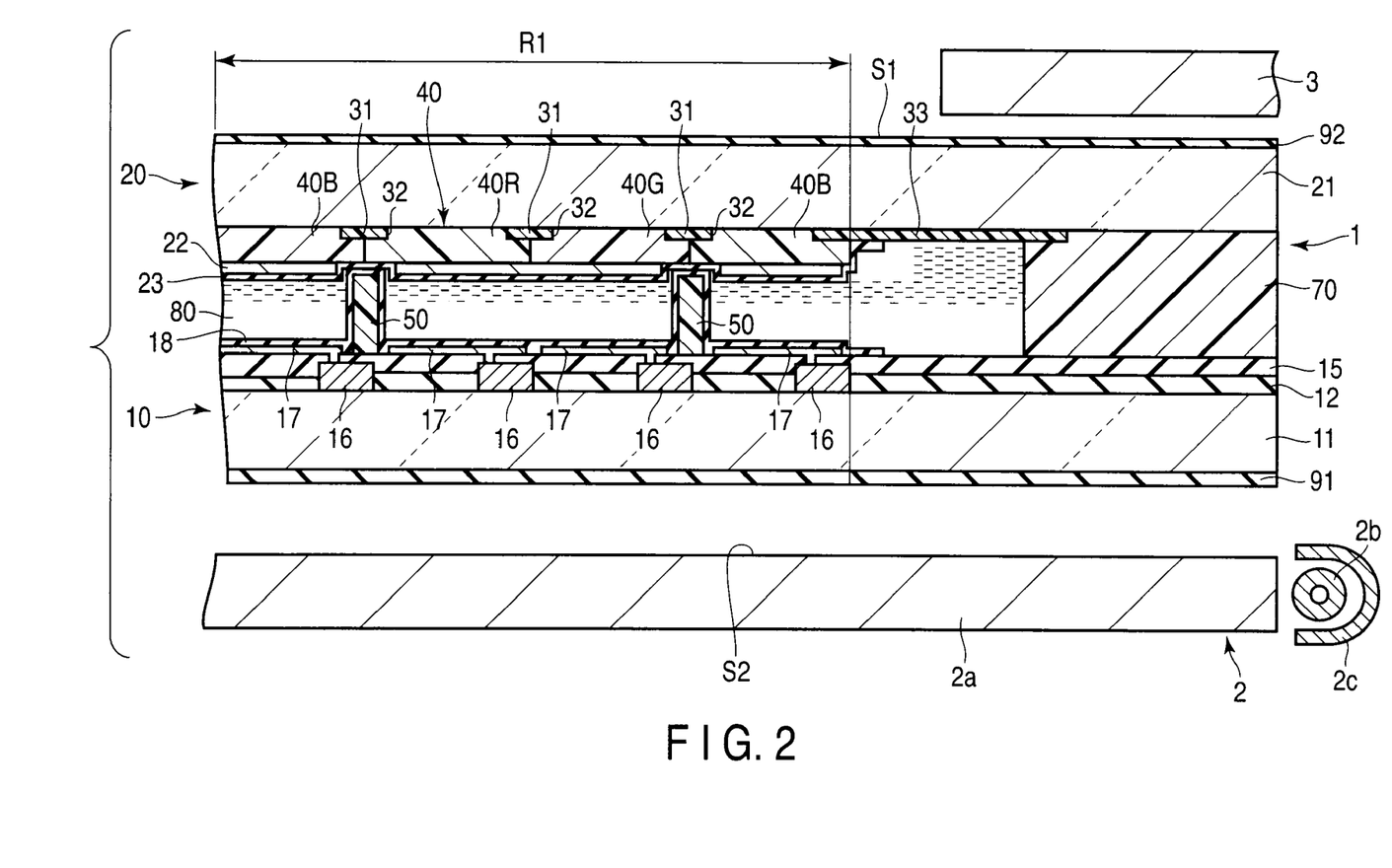
FIG. 2 is a schematic sectional view showing the liquid crystal display device shown in FIG. 1.
Figure 3:
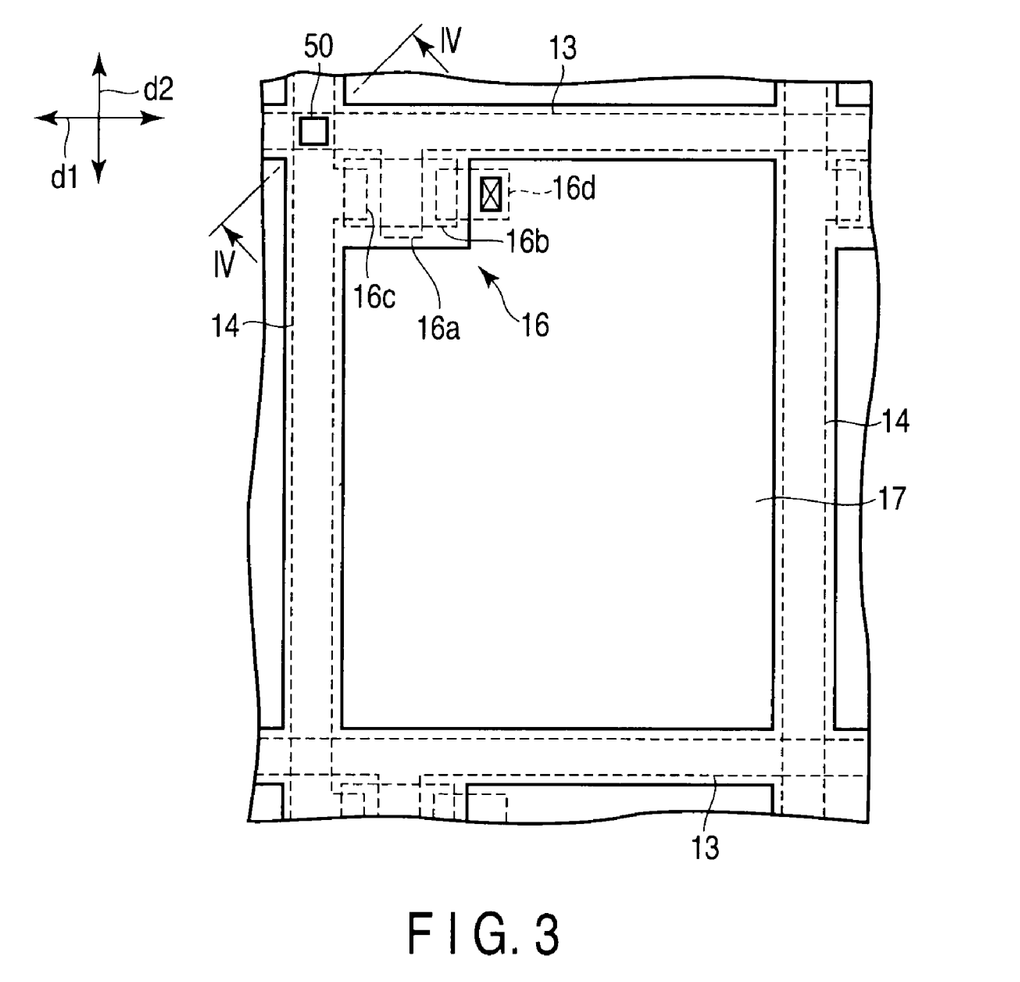
FIG. 3 is a plan view showing a wiring structure of an array substrate shown in FIGS. 1 and 2.

As shown in FIGS. 1 to 3, the liquid crystal display device has a liquid crystal display panel 1, a backlight unit 2, and a bezel 3. The liquid crystal panel 1 has an array substrate 10, an opposite substrate 20, a color filter 40, a columnar spacer 50, a sealing member 70, a liquid crystal layer 80, a first polarizer 91, and a second polarizer 92. The liquid crystal display panel 1 has a rectangular display region R1 overlapping the array substrate 10 and the opposite substrate 30.

As shown in FIGS. 1 to 5, the active matrix array substrate 10 has a glass substrate 11 as a transparent insulating substrate. A gate insulating film 12 is formed on the glass substrate 11. In the display region R1, a plurality of scanning lines 13 and a plurality of signal lines 14 are provided on the gate insulating film 12 across an insulating film (not shown in the drawings) like a lattice.

Figure 5:
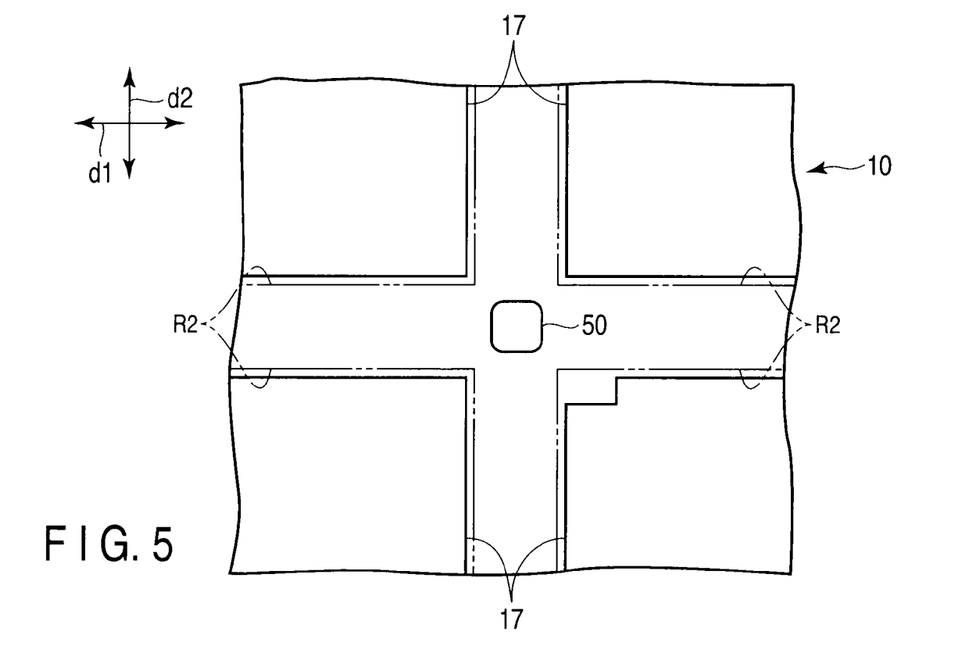
FIG. 5 is an enlarged plan view of the array substrate shown in FIGS. 1 to 4, the view particularly showing pixel electrodes, pixel regions, and a columnar spacer.

Pixels P are provided in a matrix along a first direction d1 and a second direction d2 along the plane of the liquid crystal display panel 1. A pixel region R2 is partitioned by two adjacent scanning lines 13 and two adjacent signal lines 14. The pixels P are formed in the pixel region R2.

Figure 4:
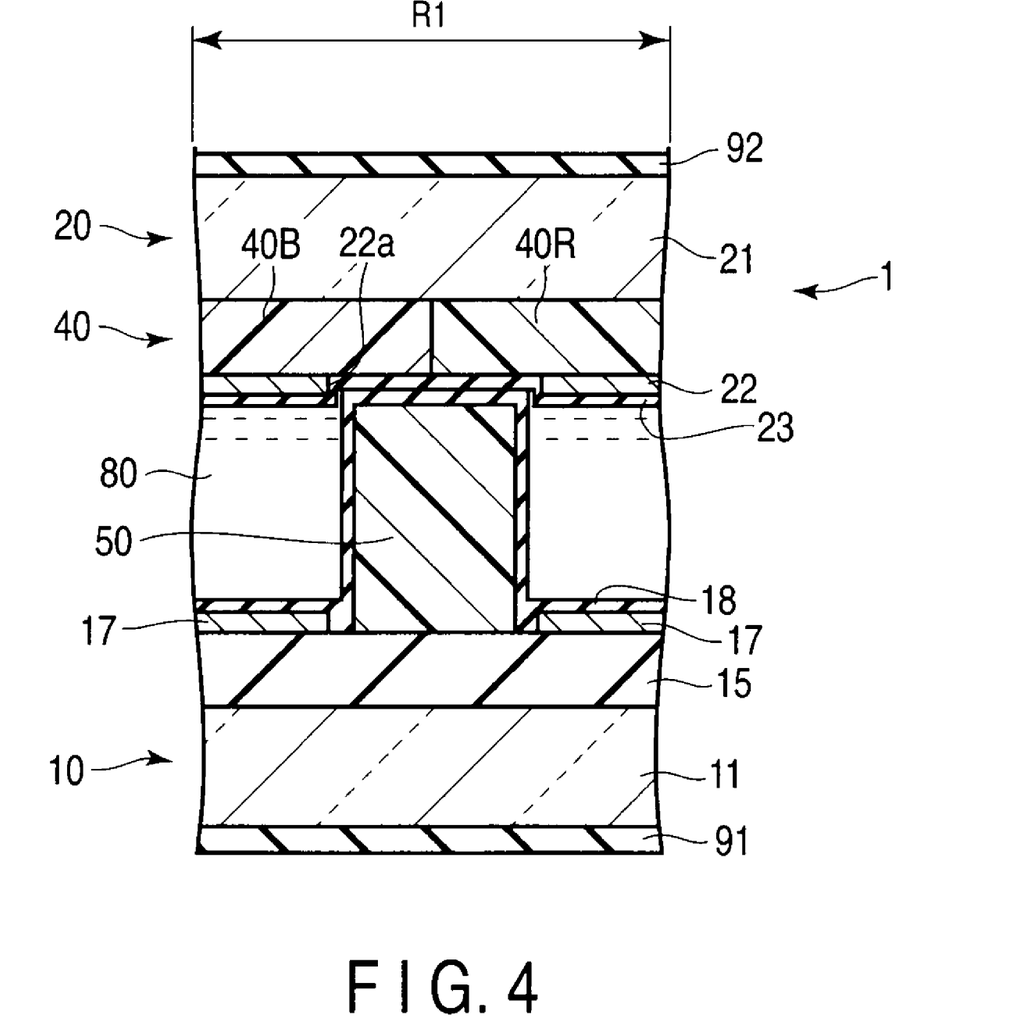
FIG. 4 is a sectional view showing a liquid crystal display panel taken along line IV-IV in FIG. 3.

An interlayer insulating film 15 is formed on the gate insulating film 12, the scanning lines 13, and the signal lines 14. The interlayer insulating film 15 is formed an organic resin as an organic material. The thickness of the interlayer insulating film 15 is about 1 to 4 μm. For example, TFT 16 is provided in the vicinity of a crossing portion between each of the scanning lines 13 and each of the signal lines 14 as a switching element. TFT 16 is electrically connected to the scanning line 13 and the signal line 14.

TFT 16 has a gate electrode 16a corresponding to an extension of a part of the scanning line 13, a channel layer 16b located opposite the gate electrode via the gate insulating film 12, a source electrode 16c connected to one of the regions of the channel layer, and a drain electrode 16d connected to the other region. In the present embodiment, the channel layer is formed of polysilicon (p-Si). The source electrode 16c is connected to the signal line 14. The drain electrode 16d is connected to a pixel electrode 17 described below.

A plurality of the pixel electrodes 17 are formed on the interlayer insulating film 15 in a matrix. Each of the pixel electrodes 17 is formed of a transparent conductive film such as ITO (Indium Tin Oxide). ITO is an inorganic material. The pixel electrode 17 is connected to the drain electrode 16d via a contact hole formed in the interlayer insulating film 15.

The pixel P is formed of TFT 16, the pixel electrode 17, and the like.

Although not entirely shown, a plurality of the columnar spacers 50 are formed on the interlayer insulating film 15 at a predetermined density. Each of the columnar spacers 50 overlaps the interlayer insulating film 15 and is positioned away from the pixel electrode 17. In the present embodiment, the columnar spacer 50 is positioned completely away from the pixel electrode 17 and completely away from the pixel region R2. The columnar spacer 50 is formed of a transparent resin. A cross section of the columnar spacer 50 in a direction along the plane of the liquid crystal display panel is rectangular.

An alignment film 18 is formed on the glass substrate 11 so as to overlap the pixel electrodes 17.

As shown in FIGS. 1 to 4 and 6, the opposite substrate 20 has a glass substrate 21 as a transparent insulating substrate. In the display region R1, light blocking layers 31 overlapping the scanning lines 13 and the signal lines 14 are formed on the glass substrate 21. The light blocking layers 31 form a plurality of openings 32 in a matrix.

A peripheral light blocking layer 33 shaped like a rectangular frame is formed on the glass substrate 21 outside the display region R1. The peripheral light blocking layer 33 is formed all around the outer periphery of the display region R1 to contribute to blocking light leaking from between the outside of the display region R1 and the inside of the bezel 3.

A plurality of colored layers, that is, a plurality of red colored layer 40R, a plurality of green colored layers 40G, and a plurality of blue colored layers 40B are disposed on the light blocking layers 31 and the peripheral light blocking layer 33 as insulating layers formed of an organic material. The colored layers 40R, 40G, and 40B are alternately disposed adjacent to one another so as to form a color filter 40. The thickness of the color filter 40 is about 1 to 4 μm. Peripheral portions of the colored layers 40R, 40G, and 40B overlap the light blocking layers 31.

Figure 6:
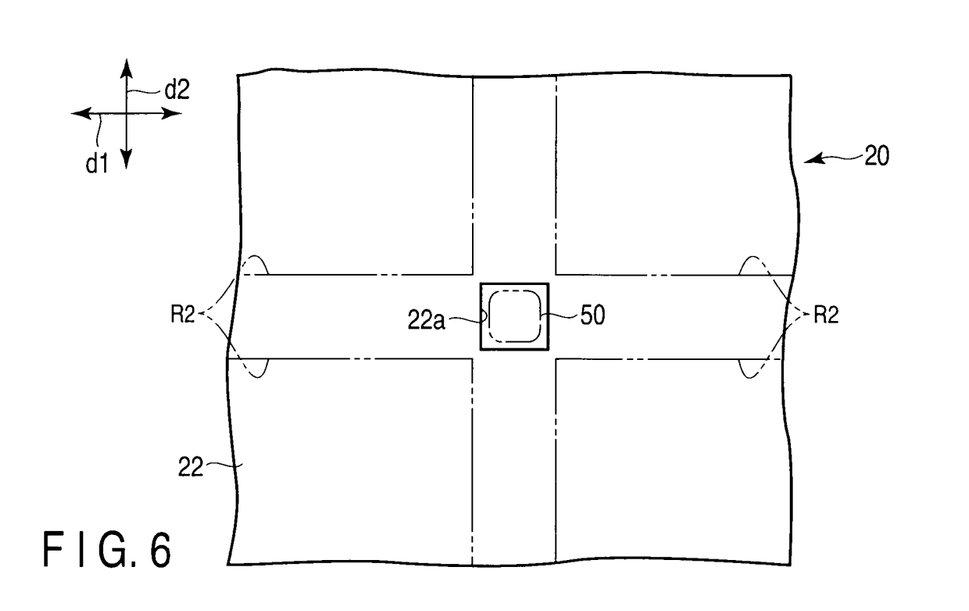
FIG. 6 is an enlarged plan view of an opposite substrate shown in FIGS. 1, 2, and 4, the view particularly showing a common electrode, a through-hole, the pixel regions, and the columnar spacer.

A common electrode 22 formed of a transparent conductive film such as ITO is provided on the colored layers 40R, 40G, and 40B. The common electrode 22 includes a plurality of through-holes 22a. In the present embodiment, each of the through-holes 22a overlaps the corresponding columnar spacer 50. The through-hole 22a is formed to be rectangular. The through-hole 22a surrounds the columnar spacer 50. Thus, the common electrode 22 is located completely away from the columnar spacer 50.

An alignment film 23 is formed on the glass substrate 21 on which the common electrode 22 is formed.

The array substrate 10 and the opposite substrate 20 are arranged opposite to each other with a predetermined gap therebetween by the columnar spacers 50. The array substrate 10 and the opposite substrate 20 are joined together by the sealing member 70 shaped like a rectangular frame and disposed on the peripheral portions of both substrates.

The liquid crystal layer 80 is sandwiched between the array substrate 10 and the opposite substrate 20. A liquid crystal injection port 71 formed in a part of the sealing member 70 is sealed with a sealant 72. A first polarizer 91 is located on an outer surface of the array substrate 10. A second polarizer 92 is located on an outer surface of the opposite substrate 20. In the present embodiment, a display surface S1 is an outer surface of the second polarizer 92.

As shown in FIGS. 1 and 2, a backlight unit 2 is located on an outer surface side of the array substrate 10. The backlight unit 2 has a light conductor 2a located opposite the first polarizer 91, and a light source 2b and a reflector 2c at one side edge of the light conductor and opposite the light conductor. The light conductor 2a has a light emitting surface S2 located opposite the first polarizer 91.

The bezel 3 is formed like a frame and located on the side of the display surface S1 and outside the display region R1. The bezel 3 is positioned such that an inner periphery thereof passes through a region located opposite the peripheral light blocking layer 33.

Now, the configuration of the liquid crystal display device will be described in further detail, together with a method of manufacturing the liquid crystal display device.

As shown in FIGS. 1 to 6, first, the gate insulating film 12, the scanning lines 13, the signal lines 14, the interlayer insulating film 15, TFTs 16, the pixel electrodes 17, and the like are formed on the prepared glass substrate 11 by a normal manufacturing process such as a repetition of deposition and patterning. The interlayer insulating film 15 is formed using an organic resin. The pixel electrodes 17 are formed using ITO.

Then, a spinner is used to coat, for example, a photosensitive transparent resin all over a surface of the glass substrate 11. The transparent resin is subsequently dried. The transparent resin is exposed and thus patterned using a predetermined photo mask. The photo mask used has a pattern required to form the columnar spacers 50.

Then, the exposed transparent resin is developed and burned and cured. Thus, a plurality of the columnar spacers 50 are formed. Each of the columnar spacers 50 is formed away from the corresponding pixel electrodes 17 (pixel regions R2).

Subsequently, an alignment film material is coated on the glass substrate 11 including the display region R1 to form the alignment film 18. In the present embodiment, the alignment film 18 is a vertical alignment film.

On the other hand, in a method of manufacturing the opposite substrate 20, first, the glass substrate 21 is prepared. Then, the light blocking layers 31 and the peripheral light blocking layer 33 are formed on the glass substrate 21. The colored layers 40R are subsequently formed on the glass substrate 21, the light blocking layers 31, and the peripheral light blocking layer 33 using, for example, a photo etching method. Subsequently, like the colored layers 40R, the colored layers 40G and 40B are formed using, for example, the photo etching method.

Subsequently, the common electrode 22 is formed so as to overlap the colored layers 40R, 40G, and 40B. Formation of the common electrode 22 involves coating ITO on the glass substrate 21 to deposit an ITO film and then removing the ITO film from regions located opposite the columnar spacers 50, using the photo lithography method. Thus, the common electrode 22 including the plurality of through-holes 22a is formed.

Then, the alignment film 23 is formed by coating the alignment film material on the glass substrate 21 including the display region R1. In the present embodiment, the alignment film 23 is a vertical alignment film.

Then, for example, an ultraviolet curing resin is coated along the periphery of the opposite substrate 20. The array substrate 10 and the opposite substrate 20 are subsequently arranged opposite to each other with the predetermined gap therebetween by the plurality of columnar spacers 50 so that the alignment films 18 and 23 are arranged opposite to each other. The peripheral portions of the array substrate 10 and the opposite substrate 20 are stuck together using the ultraviolet curing resin. The ultraviolet curing resin is thereafter irradiated with ultraviolet rays and thus cured. The sealing member 70 is consequently formed which fixes the array substrate 10 and the opposite substrate 20.

Thereafter, the array substrate 10 and opposite substrate 20 stuck together are carried into a vacuum chamber (not shown in the drawings). Then, in a vacuum, a liquid crystal is injected into a region surrounded by the array substrate 10, the opposite substrate 20, and the sealing member 70 through the liquid crystal injection port 71. The liquid crystal injection port 71 is subsequently sealed with the sealant 72 made up of, for example, an ultraviolet curing resin. The liquid crystal panel with the liquid crystal injected therein is thereafter carried out of the vacuum chamber.

Then, the first polarizer 91 is located on the outer surface of the array substrate 10. The second polarizer 92 is located on the outer surface of the opposite substrate 20. The liquid crystal display panel 1 in a VA mode is thus formed. The backlight unit 2, the bezel 3, and the like are then mounted on the liquid crystal display panel 1, which is thus assembled into a module. A liquid crystal display device is thus completed.

In the liquid crystal display device configured as described above, each of the columnar spacers 50 is positioned away from the pixel electrodes 17 and the common electrode 22. Thus, on the opposite substrate 20 side, a plurality of the through-holes 22a are formed in the common electrode 22 so that the columnar spacer 50 overlaps the corresponding through-hole 22a. Thus, the columnar spacer 50 can be located away from the pixel electrodes 17 and the common electrode 22, which are insufficiently elastic. Furthermore, since the through-hole 22a is formed away from the corresponding pixel electrode 17 and the common electrode 22, display is prevented from being affected.

On the array substrate 10 side, the columnar spacers 50 are formed on the interlayer insulating film 15, formed of the organic resin. On the opposite substrate 20 side, the columnar spacers 50 overlap the colored layers 40R, 40G, and 40B (color filter 40), formed of the organic material. In a direction perpendicular to the plane of the liquid crystal display panel 1, the members from the interlayer insulating film 15 through the color filter 40 are arranged in the following order: the interlayer insulating film 15, the columnar spacers 50, the alignment film 18, the alignment 23, and the color filter 40.

The interlayer insulating film 15 and the color filter 40 are elastic like the columnar spacers 50. Thus, an external impact applied to the liquid crystal display panel 1 when, for example, temperature is low can be absorbed by the whole liquid crystal display panel 1, including the columnar spacers 50. Since a variation in volume can be sufficiently followed, possible bubbles (cavity portions) between the array substrate 10 and the opposite substrate 20 can be inhibited. Thus, even with an external impact, appropriate images can be displayed.

Since the color filter 40 is provided on the opposite substrate 20 side, an external impact can be absorbed on the array substrate 10 side and on the opposite substrate 20 side without the need to increase the number of conventional manufacturing steps and members.

As described above, a liquid crystal display device with high display quality can be obtained.

Now, a liquid crystal display device according to another embodiment of the present invention will be described in detail. A part of the configuration of the present embodiment which is not described below is the same as that in the above-described embodiment. The same components are denoted by the same reference numerals and the detailed description thereof is omitted.

Figure 7:
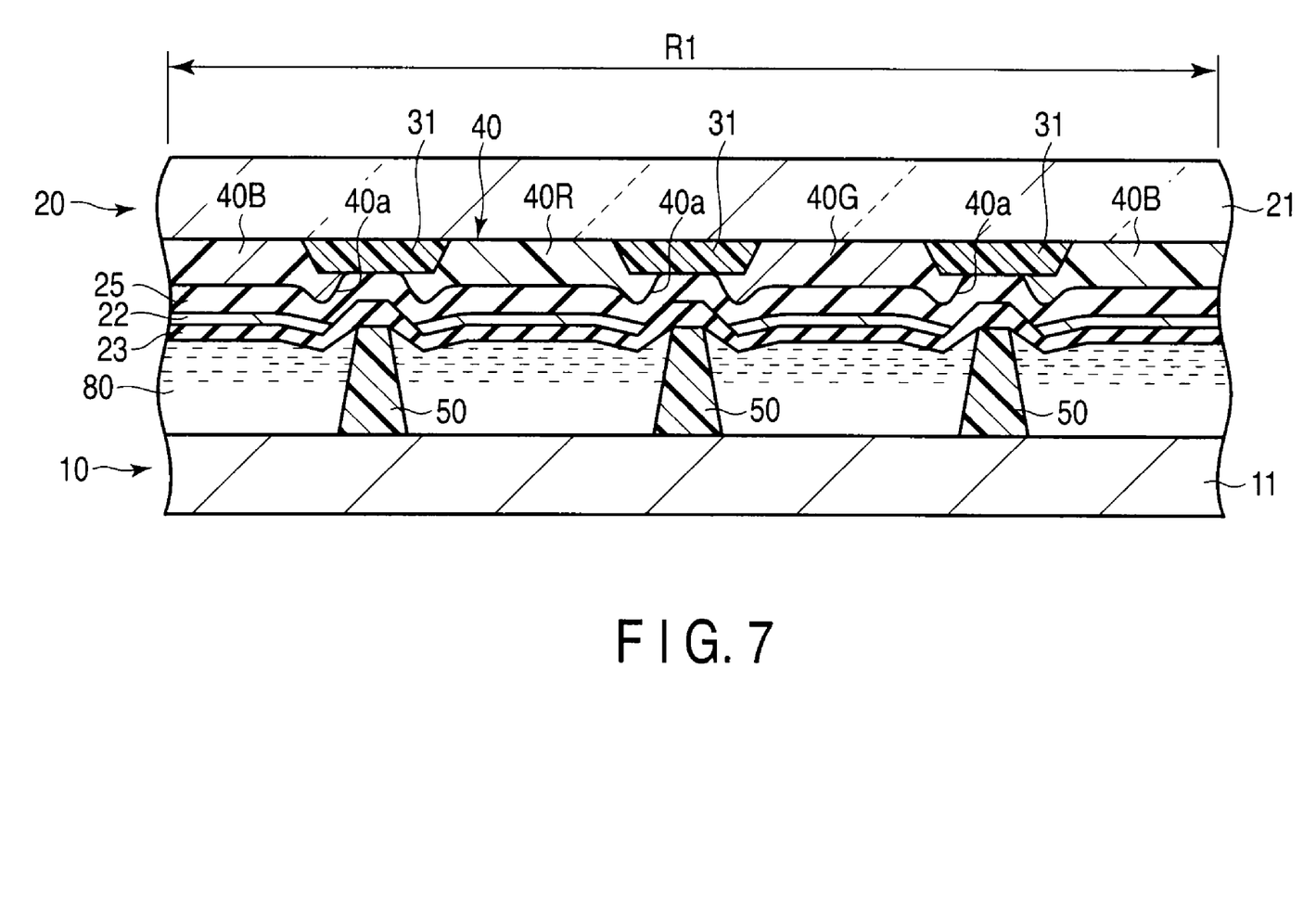
FIG. 7 is a sectional view schematically showing a liquid crystal display panel in a liquid crystal display device according to another embodiment of the present invention.

Although not shown in the drawings, the liquid crystal display device has the above-described liquid crystal display panel 1, the backlight panel 2, and the bezel 3. As shown in FIG. 7, the liquid crystal display panel 1 comprises the array substrate 10, the opposite substrate 20, the color filter 40, the columnar spacers 50, and the liquid crystal layer 80. Although not shown in the drawings, the liquid crystal display panel 1 also has the sealing member 70, first polarizer 91, and second polarizer 92, described above. The liquid crystal display panel 1 has a pixel pitch of 30.0 μm.

Figure 8:
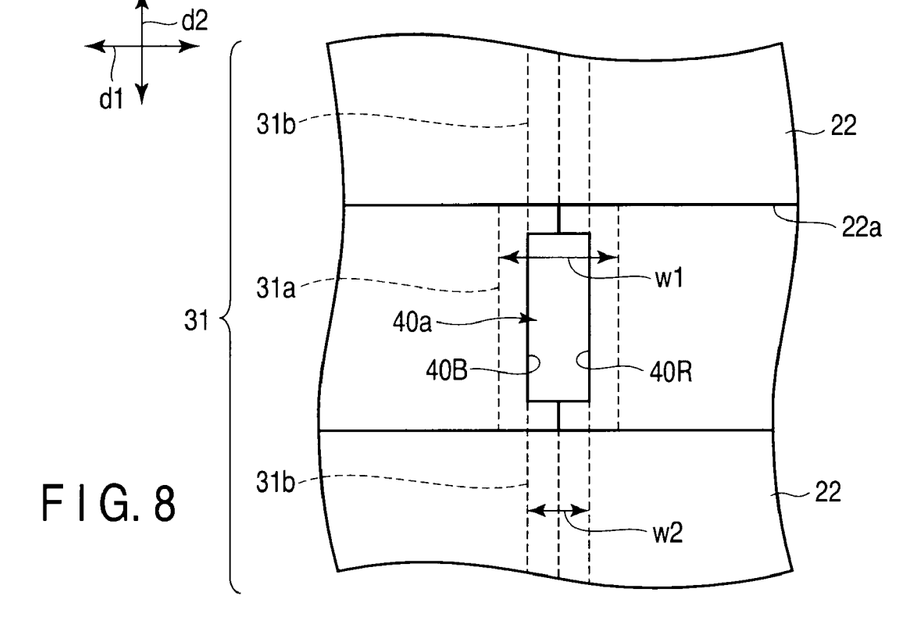
FIG. 8 is an enlarged plan view of the opposite substrate shown in FIG. 7, the view particularly showing that the common electrode, a through-hole, colored layers, and a light blocking layer 31 are viewed from the common electrode side.

As shown in FIGS. 7 and 8, in the opposite substrate 20, the light blocking layers 31 and the peripheral light blocking layer 33 (not shown in the drawings) are formed on the glass substrate 21. The light blocking layers 31 are extended so as to form stripes or a lattice. In the present embodiment, the light blocking layers is formed like a lattice.

The light blocking layer 31 has an overlapping portion 31a and a non-overlapping portion 31b. The overlapping portion 31a overlaps the corresponding columnar spacer 50. The non-overlapping portion 31b is located away from the columnar spacer 50. The overlapping portion 31a and the non-overlapping portion 31b are arranged in the second direction d2. The width w1 of the overlapping portion 31a is larger than the width w2 of the non-overlapping portion 31b. The peripheral portions of the colored layers 40R, 40G, and 40B overlap the light blocking layers 31. The color filter 40 has a cutout portion 40a formed in a part thereof which overlaps the overlapping portion 31a. The cutout portion 40a is rectangular and has a length of 6 μm in the first direction d1 and a length of 12 μm in the second direction d2. In the overlapping portion 31a of the light blocking layer 31, the cutout portion 40a is not covered with the color filter 40. That is, the overlapping portion 31a is made up of a portion in which the color filter 40 lies over and overlaps the light blocking layer 31, and the cutout portion 40a, in which the color filter 40 is not present and the light blocking layer 31 is exposed. On the other hand, the overlapping portion 31b of the light blocking layer 31 is entirely covered with the color filter layer.

An undercoat film 25 made of a transparent conductive material is formed on the light blocking layer 31 and the colored layers 40R, 40G, and 40B. The undercoat film 25 serves to flatten the opposite substrate 20 and to protect the liquid crystal layer 80.

The common electrode 22 is formed on the undercoat film 25. The common electrode 22 includes a plurality of the through-holes 22a. In the present embodiment, each of the through-holes 22a overlaps the corresponding columnar spacer 50. The through-holes 22a are formed like stripes and extended in the first direction d1. The through-hole 22a has a width of 12 μm in the second direction d2. The common electrode 22 is located completely away from each of the columnar spacers 50. The alignment film 23 is formed on the glass substrate 21 on which the common electrode 22 is formed.

Each of the columnar spacers 50 is formed on the array substrate 10. The columnar spacer 50 is positioned away from the corresponding pixel electrodes 17. The columnar spacer 50 is provided so as to overlap the through-hole 22a, the overlapping portion 31a, and the cutout portion 40a. Furthermore, since in the cutout portion 40a over the overlapping portion 31a, serving as a pedestal, the color filter 40 is not present on the light blocking layer 31 and the light blocking layer 31 is exposed, a surface of the opposite substrate 20 over the cut portion 40a is sufficiently flattened by the undercoat film 25. That is, in an area overlapping the cutout portion 40a, the distance between the array substrate 10 and the opposite substrate 20 is uniform. The columnar spacer 50 is provided in the area in which the distance between the array substrate 10 and the opposite substrate 20 is uniform.

The liquid crystal layer 80 contains a liquid crystal material with a negative dielectric constant anisotropy.

In the liquid crystal display device configured as described above, each of the columnar spacers 50 is positioned away from the corresponding pixel electrodes 17 and the common electrode 22. On the opposite substrate 20 side, the plurality of through-holes 22a are formed in the common electrode 22, and the columnar spacer 50 is provided so as to overlap the corresponding through-hole 22a. Thus, the columnar spacer 50 can be formed away from the pixel electrodes 17 and common electrode 22, which are insufficiently elastic. Furthermore, each of the through-holes 22a is formed away from the corresponding pixel electrodes 17 and the common electrode 22. This prevents display from being affected. Furthermore, the pixel electrodes 17 and the common electrode 22 can be prevented from being destroyed. A possible defect can thus be prevented in which a bright spot results from damage to any of the electrodes.

The columnar spacer 50 is positioned away from the color filter 40 so as to overlap the overlapping portion 31a and the cutout portion 40a. The opposite substrate 20 overlapping the overlapping portions 31a has a uniform height. A tip portion of the columnar spacer 50 can be appropriately contacted with the opposite substrate 20. Thus, the elasticity of the columnar spacer 50 with respect to a load can be maximized.

Thus, the shape of the columnar spacer 50 can flexibly follow an external impact. Furthermore, the gap between the array substrate 10 and the opposite substrate 20 can be held constant. This enables prevention of a possible inappropriate display resulting from a possible locally inappropriate gap. Furthermore, a possible decrease in transmittance, which is an optical characteristic, possible yellowing of a white display, and a possible uneven display can be inhibited.

By providing the columnar spacer 50 on the opposite substrate 20 side in an area where the sizes of recesses and protrusions do not vary significantly, a variation in cell gap among lots can be reduced. Thus, if a liquid crystal drop injection method is used, the range of a dropping margin can be increased. As a result, a liquid crystal display device with a high product yield can be obtained.

If the color filter 40 is formed without the cutout portion 40a, the peripheral portions of the colored layers may overlap each other, so that the sizes of the recesses and protrusions on the opposite substrate 20 may vary significantly. In such a case, the manner of contact with the opposite substrate 20 varies among the columnar spacers 50. Then, some columnar spacers are always in contact with the opposite substrate, whereas the others fail to contact the opposite substrate. Furthermore, in this case, even the undercoat film 25 formed fails to achieve sufficient flattening. As a result, the sizes of the recesses and protrusions on the opposite substrate 20 vary significantly.

Additionally, since the through-holes 22a of width 12 μm are formed in the common electrode 22, the orientation state of liquid crystal molecules is maintained, enabling display with an excellent visual angle characteristic. Thus, the through-holes 22a in the common electrode 22 control a direction in which liquid crystal molecules in the liquid crystal layer 80 are inclined.

Figure 9:
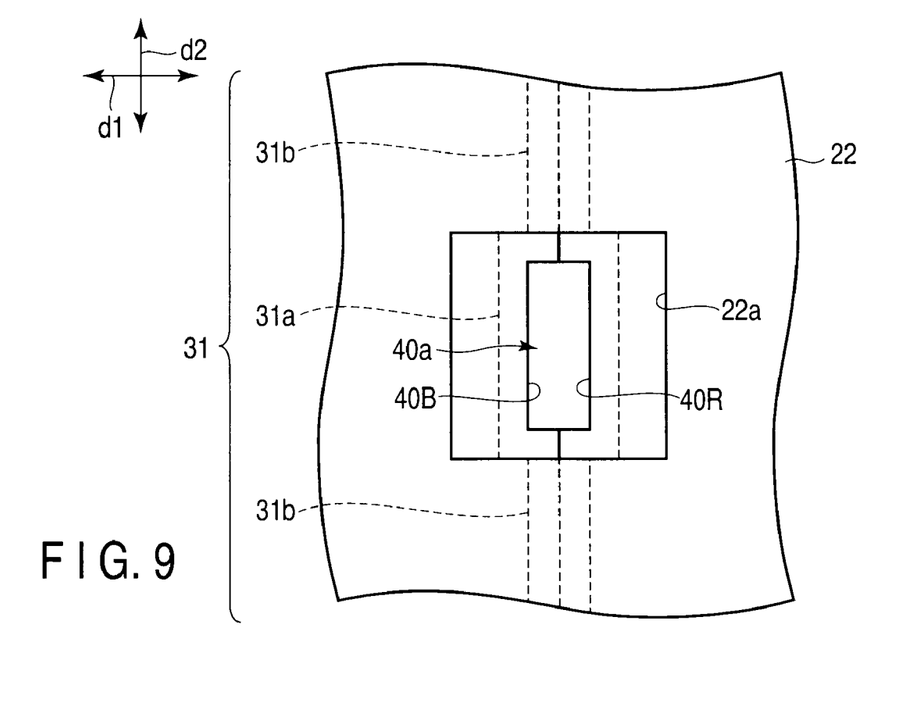
FIG. 9 is an enlarged plan view of an opposite substrate in a liquid crystal display device according to another embodiment of the present invention, the view particularly showing a modification of the through-hole shown in FIG. 8.
Figure 10:
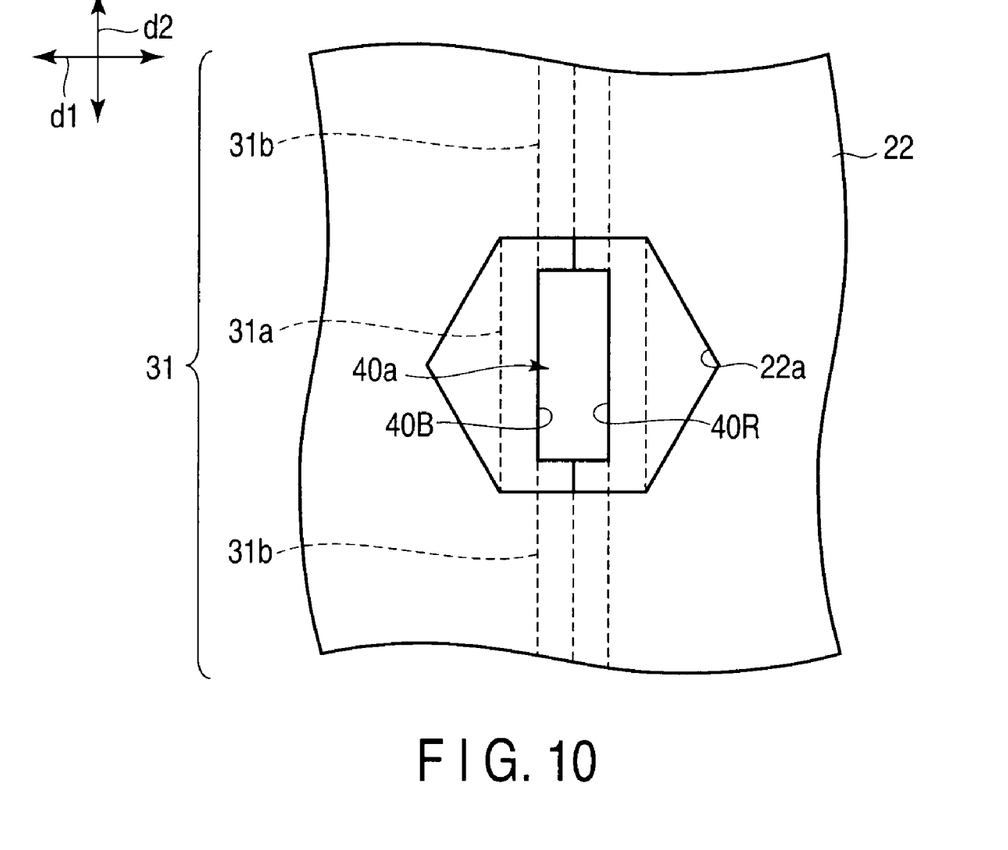
FIG. 10 is an enlarged plan view of an opposite substrate in a liquid crystal display device according to another embodiment of the present invention, the view particularly showing another modification of the through-hole shown in FIG. 8.

The shape of the through-holes 22a is not limited to the stripes but may be varied. For example, as shown in FIG. 9, the through-hole 22a may be rectangular. Also in this case, the through-holes 22a in the common electrode 22 control the direction in which the liquid crystal molecules in the liquid crystal layer 80 are inclined. Alternatively, as shown in FIG. 10, the through-hole 22a may be hexagonal. Also in this case, the through-holes 22a in the common electrode 22 control the direction in which the liquid crystal molecules in the liquid crystal layer 80 are inclined. In particular, the through-hole 22a in this case is suitable for a liquid crystal display device in an MVA (Multi-domain Vertically Aligned) mode.

As described above, a liquid crystal display device with high display quality can be obtained.

The present invention is not limited to the as-described embodiments. In implementation, the components of the embodiments can be varied without departing from the spirit of the present invention. Furthermore, various inventions can be formed by appropriately combining a plurality of the components disclosed in the above-described embodiments. For example, some of the components shown in the embodiments can be omitted. Moreover, components of different embodiments may be combined together.

For example, the shapes of the columnar spacer 50 and the through-hole 22a are not limited to those in the above-described embodiments but may be varied. The columnar spacers 50 have only to be formed on either one of the array substrate 10 and the opposite substrate 20. The columnar spacer 50 need not be positioned completely away from the corresponding pixel electrode 17. The columnar spacer 50 may partly overlap the pixel electrode 17. The columnar spacer 50 need not entirely overlap the corresponding through-hole 22a. The columnar spacer 50 may be positioned so as to partly overlap the common electrode 22.

Although not shown in the drawings, if the color filter 40 is provided on the array substrate 10, the opposite substrate 20 may have an insulating layer, which is positioned opposite the array substrate 10 with respect to the common electrode 22, laminated on the common electrode 22 and formed of an organic material. Then, the columnar spacers may be laid on top of the insulating layer.

What is claimed is:

1. A liquid crystal display panel comprising:
   an array substrate including a scanning line, a signal line crossing the scanning line, a switching element electrically connected to the scanning line and the signal line, and a pixel electrode formed on the scanning line, the signal line, and the switching element and electrically connected to the switching element;
   an opposite substrate including a common electrode with a plurality of through-holes and arranged opposite to the array substrate with a gap;
   a light blocking portion provided on either one of the array substrate and the opposite substrate;
   a color filter provided on either one of the array substrate and the opposite substrate and including a plurality of colored layer in respective colors, the color filter including a cutout portion formed so as to overlap the light blocking portion;
   a columnar spacer formed on either one of the array substrate and the opposite substrate, the columnar spacer does not overlap either of the pixel electrode and the common electrode, the columnar spacer overlapping and surrounded with each of the through-holes, the light blocking portion, and the cutout portion and holding the gap between the array substrate and the opposite substrate; and
   a liquid crystal layer sandwiched between the array substrate and the opposite substrate and including a liquid crystal material with a negative dielectric constant anisotropy,
   wherein the through-holes are formed into stripes by removing the common electrode from a region located opposite the columnar spacer, extend in parallel with either the signal line or the scanning line, and control a direction in which a liquid crystal molecule in the liquid crystal layer is inclined.

2. The liquid crystal display panel according to claim 1, wherein the light blocking portion and the color filter are provided on the opposite substrate and positioned opposite the array substrate with respect to the common electrode, and the columnar spacer is formed on the array substrate.

3. The liquid crystal display panel according to claim 1, wherein the light blocking portion is extended so as to form a stripe or a lattice, and has an overlapping portion overlapping the columnar spacer and a non-overlapping portion positioned away from the columnar spacer, and
   width of the overlapping portion is greater than width of the non-overlapping portion.

* * * * *